United States Patent [19]
Miyaoka

[11] 3,936,872
[45] Feb. 3, 1976

[54] VIDEO SIGNAL REPRODUCING DEVICE WITH ELECTRON BEAM SCANNING VELOCITY MODULATION

[75] Inventor: Senri Miyaoka, Fujisawa, Japan

[73] Assignee: Sony Corporation, Tokyo, Japan

[22] Filed: Oct. 17, 1974

[21] Appl. No.: 515,665

[30] Foreign Application Priority Data
Dec. 21, 1973 Japan.................................. 48-3433
June 4, 1974 Japan............................. 49-64815

[52] U.S. Cl.................. 358/64; 178/7.5 R; 178/7.7
[51] Int. Cl.² ......................................... H04N 9/16
[58] Field of Search........... 178/7.5 R, 7.7, DIG. 25, 178/DIG. 34; 358/64, 65; 313/414, 441; 315/5.41, 5.42

[56] References Cited
UNITED STATES PATENTS

| | | | |
|---|---|---|---|
| 2,678,964 | 5/1954 | Loughlin | 178/7.5 R |
| 3,678,316 | 7/1972 | Barten | 313/414 X |
| 3,752,916 | 8/1973 | Lowry et al. | 178/DIG. 34 |
| 3,830,958 | 8/1974 | Fuse et al. | 178/7.5 R X |

Primary Examiner—Albert J. Mayer
Assistant Examiner—Mitchell Saffian
Attorney, Agent, or Firm—Lewis H. Eslinger; Alvin Sinderbrand

[57] ABSTRACT

In a video signal reproducing device having a cathode ray tube in which at least one electron beam is focused at a phosphor screen and is made to scan the screen in line-scanning and vertical directions, and in which the beam focusing is effected by an electron lens constituted by at least two tubular electrodes arranged coaxially in succession along the axis of the tube with a relatively low potential being applied to one of the electrodes and a relatively high potential being applied to the other electrode or electrodes; electron beam scanning velocity modulation is effected by forming the tubular electrode to which the low potential is applied in two parts which are axially separated along a vertical plane inclined relative to the tube axis, and by applying across the two parts of such tubular electrode a control signal which is produced in response to transient changes in the luminance or brightness of the video signal being reproduced. Such control signal is preferably provided by a circuit which employs only a single delay line to provide the velocity modulating control signal as the difference between a luminance or brightness component of the video signal and such component delayed twice by the delay line, and a further control signal constituted by the luminance or brightness component delayed once by the delay line and which is employed for modulating the intensity of the electron beam or beams.

17 Claims, 10 Drawing Figures

VIDEO SIGNAL REPRODUCING DEVICE WITH ELECTRON BEAM SCANNING VELOCITY MODULATION

BACKGROUND OF THE INVENTION

1. Field of the Invention

This invention relates generally to video signal reproducing devices, and more particularly is directed to improvements in such devices for modulating the scanning velocity of the electron beam or beams for reproducing a picture image having significantly improved sharpness.

2. Description of the Prior Art

When the phosphor screen of a video signal reproducing device, as in the cathode ray tube of a television receiver, is scanned by an electron beam or beams so as to form a picture image on the phosphor screen, the electron beam forms on the phosphor screen a beam spot whose size is larger at high brightness levels than the spot formed by the electron beam corresponding to the low brightness level portions of the image. Further, when a beam scanning the screen moves across the demarcation or edge between image areas of low and high brightness, for example, black and white areas, respectively, the beam intensity cannot switch instantly from the low level characteristic of the black area to the high level characteristic of the white area, with the result that the sharpness of the reproduced image is degraded at portions of the image where sudden changes in brightness occur in response to transient changes in the luminance or brightness of the video signal being reproduced.

As means of compensating for such degradation of the apparent response of the picture image, an aperture compensation technique has been proposed and is described, for example, in R. C. Dennison, "Aperture Compensation for Television Camera", RCA Review, 14,569 (1953). In accordance with such aperture compensation technique, the intensity of the electron beam is first decreased and then increased at those portions of the picture image at which the brightness changes from a low level to a high level. Although this procedure actually increases the time required for transition of the beam intensity between its low and high levels, there is created a visual edge effect which, to some extend and in the case of relatively small screens, registers psychologically as improved edge sharpness. However, such compensation is insufficient for achieving really sharp definitions between light and dark areas of a reproduced image, particularly in the case of relatively large screen areas.

In order to avoid the above disadvantage of the aperture compensation technique, it has been proposed to detect transient changes in the brightness level of the video signal being reproduced and to change the electron beam scanning velocity from its normal velocity in reponse to the thus detected transient changes. Devices employing the foregoing so-called velocity modulation have been described, for example, in U.S. Pat. No. 2,227,630, No. 2,678,964 and No. 3,752,916.

However, difficulties are encountered in respect to the means employed for modulating the electron beam scanning velocity from its normal velocity. For example, in each of U.S. Pat. No. 2,227,630 and No. 2,678,964 it is proposed to supply the control signal for effecting the beam scanning velocity modulation to an additional deflection coil provided on the neck portion of the cathode ray tube so as to produce a magnetic field for suitably influencing the scanning velocity. However, by reason of the inductance and capacitance inherent in such additional deflection coil, the beam scanning velocity cannot be modulated at the required frequency. Although the foregoing problem is overcome by employing electrostatic deflection of the beam to achieve the scanning velocity modulation, for example, as also disclosed in U.S. Pat. No. 2,678,964 and as disclosed in U.S. Pat. No. 3,752,916, the arrangement proposed in these patents are disadvantageously limited to effective use only in monochrome or black-and-white television receivers and, in any case, require elongation of the cathode ray tube neck and consequently undesirably increase the depth of the television receiver cabinet. In each of U.S. Pat. No. 2,678,964 and No. 3,752,916, the control signal for effecting velocity modulation is applied across additional deflection plates disposed in the cathode ray tube neck, preferably in advance of the electromagnetic or electrostatic field by which the electron beam is focused at the phosphor screen. It will be apparent that the electrostatic deflection of the beam in response to such control signal for achieving the desired velocity modulation causes the electron beam to deviate from a path through the center of the focusing field at which minimum aberrations are imparted to the focused beam. Although such aberrations may be tolerable in the case of a monochrome television receiver, the problem is accentuated in the case of a color television receiver in which three electron beams are usually employed. In the case of color television receiver employing three electron beams originating at spaced apart points and being directed to impinge on respective color phosphors of the screen after passing through either a common focusing field or individual focusing fields, the electrostatic deflection of the beams in advance of such focusing field or fields gives rise to undersirable aberrations in the focused beams. Further, since the beams are subjected to electrostatic deflection to achieve velocity modulation at locations where the beams are relatively widely spaced apart, individual sets of deflection plates have to be provided for the three beams with the result that the structure is undesirably complicated.

In U.S. Pat. No. 3,830,958, issued Aug. 20, 1974, and having a common assignee herewith, arrangements are disclosed for effecting beam scanning velocity modulation in color video signal reproducing devices, particularly of the type disclosed in U.S. Pat. No. Re. 27,751, and which are known as color cathode ray tubes of the Trinitron (Trademark) type. In such devices of the Trinitron (trademark) type, the three electron beams for energizing respective phosphors arranged in groups on the screen are made to converge from laterally spaced apart points of origin so as to intersect each other at a location which is substantially at the center of the main focusing lens and to exit from the latter along divergent paths with which convergence deflecting means are associated for reconverging the electron beams to impinge on the respective phosphors in one of the groups thereof, and a deflection yoke is provided on the color cathode ray tube between the convergence deflecting means and the screen for causing the beams to scan the screen in line-scanning and vertical direction. In U.S. Pat No. 3,830,958, it is proposed that velocity modulation be effected in color video signal reproducing devices of the foregoing type by means of a single pair of deflection plates spaced apart in the line-scanning direction and being disposed immediately adjacent the main focusing lens between the latter and the convergence deflecting means so that the three beams pass between the deflecting plates at portions of their respective divergent paths that are relatively close to each other. Therefore, when a control signal is applied across such pair of deflection plates in response to transient changes in the brightness of the video signal being reproduced, the resulting electrostatic field deflects the three beams more or less equally for achieving the desired velocity modulation. However, it will be apparent that the effect of the electrostatic field on the three beams is not precisely equal by reason of the spacing between their respective paths through such field. Further, the deflecting plates added to the electron gun for achieving the described velocity modulation necessarily increases the length thereof so that the depth of the cabinet cannot be minimized.

In previously existing circuits for providing the control signal by which beam scanning velocity modulation is effected in response to transient changes in the luminance or brightness component of the video signal being reproduced, a plurality of delay lines are employed. For example, in U.S. Pat. No. 3,830,958, a luminance signal separated from the color video signal being reproduced is applied to the input end of a first delay line and also to a subtractor while the output from the first delay line, that is, the once delayed luminance signal, is applied to the input of a second delay line to provide, at the output of the latter, a twice delayed luminance signal applied to the subtractor so that the output of the latter is the difference between the separated luminance signal and the twice delayed luminance signal and consitutes the control signal for the velocity modulation. The once delayed luminance signal from the first delay line is also applied to the matrixing circuit which receives color difference signals and which is operative to provide respective color signals by which the beam intensities are controlled. However, since delay lines are relatively costly components, it is desirable to reduce the number of such components required for producing the control signal by which velocity modulation is effected.

SUMMARY OF THE INVENTION

Accordingly, it is an object of this invention to provide a video signal reproducing device with an improved arrangement for effecting beam scanning velocity modulation and thereby achieving enhanced sharpness of the reproduced image or picture, particularly at the demarcations between relatively dark and light picture areas.

Another object is to provide an arrangement for effecting beam scanning velocity modulation, as aforesaid, which is readily applicable to color video signal reproducing devices, such as, color television receivers.

Another object is to provide an arrangement for effecting beam scanning velocity modulation, as aforesaid, which does not require elongation of the cathode ray tube neck, and which therefore permits minimizing of the cabinet depth for accommodating such tube.

Still another object is to provide an arrangement for effecting beam scanning velocity modulation, as aforesaid, and which has relatively high sensitivity to the control signal therefor, so that such control signal may be of relatively low voltage for safety and ease of production.

A further object is to provide an improved circuit which includes a single delay line for producing the control signal by which beam scanning velocity modulation is achieved in response to transient changes in the luminance of brightness component of the video signal being reproduced.

A Still further object is to provide an improved arrangement for effecting beam scanning velocity modulation in a color cathode ray tube device of the Trinitron (trademark) type.

In accordance with an aspect of the invention, in a video signal reproducing device of the type having a cathode ray tube in which at least one electron beam is made to scan a phosphor screen in line-scanning and vertical directions and focusing of each beam at the screen is effected by a main electron focusing lens having at least two tubular electrodes arranged coaxially in succession along the tube axis with a relatively low potential being applied to one of the electrodes and a relatively high potential being applied to the other electrode or electrodes; electron beam scanning velocity modulation is effected by forming the electron focusing lens electrode to which the low potential is applied in two parts which are axially separated along a vertical plane inclined relative to the tube axis, and by applying across those two parts of each electrode a control signal which is produced in response to transient changes in the luminance or brightness of the video signal being reproduced.

The foregoing arrangement for effecting beam scanning velocity modulation according to this invention is applicable to monochrome, or black-and-white video signal reproducing devices, as well as to color video signal reproducing devices, and in all instances requires no additional electrodes in the electron gun structure so that the manufacture of the latter is simplified and its length may be desirably minimized. Further, such beam scanning velocity modulation according to the invention may be embodied in devices having unipotential or bipotential lenses for focusing the electron beam or beams.

Beam scanning velocity modulation according to the invention is particularly suited for incorporation in color video signal reproducing devices of the Trinitron (trademark) type, as aforesaid, in that, in such devices, the three beams having spaced apart points of origin are made to converge so as to intersect each other at a location substantially at the center of the main focusing lens. Therefore, the control signal applied across the two parts of the lens electrode having the relatively low potential applied thereto produces a beam deflecting field at or near the location of intersection of the beams so as to act at least substantially equally on all of the beams. Further, since the beams intersect each other substantially at the center of the main focusing lens, the deflection of the beams for achieving beam scanning velocity modulation does not cause any of the beams to depart from the central portion of the main focusing lens field and, therefore, the desired scanning velocity modulation is achieved without imparting coma or spherical aberrations to the beam landing spots on the screen, as would be the case if the deflected beams passed through peripheral portions of the main focusing lens field.

In accordance with another aspect of this invention, the control signal for effecting beam scanning velocity modulation in response to transient changes in the brightness of the video signal being reproduced is provided by a circuit that comprises a single delay line having a brightness component of the video signal applied to its input end, a transistor of base-common configuration connected to the output end of the delay line for shorting said output end in response to transient changes in the brightness component so that the latter once delayed by said delay line is reflected from said output end back along the delay line for providing said brightness component twice delayed by said delay line at said input end of the latter, means for detecting the short circuited current through the transistor so as to obtain the once delayed brightness component therefrom for use in modulating the intensity of the electron beam or beams, and means connected with said input end of the delay line for deriving therefrom the velocity modulation control signal as the difference between the original brightness component and the twice delayed brightness component.

The above, and other objects, features and advantages of this invention, will be apparent in the following detailed description of illustrative embodiments thereof which is to be read in connection with the accompanying drawings.

DESCRIPTION OF THE PREFERRED EMBODIMENTS

Figure 1:
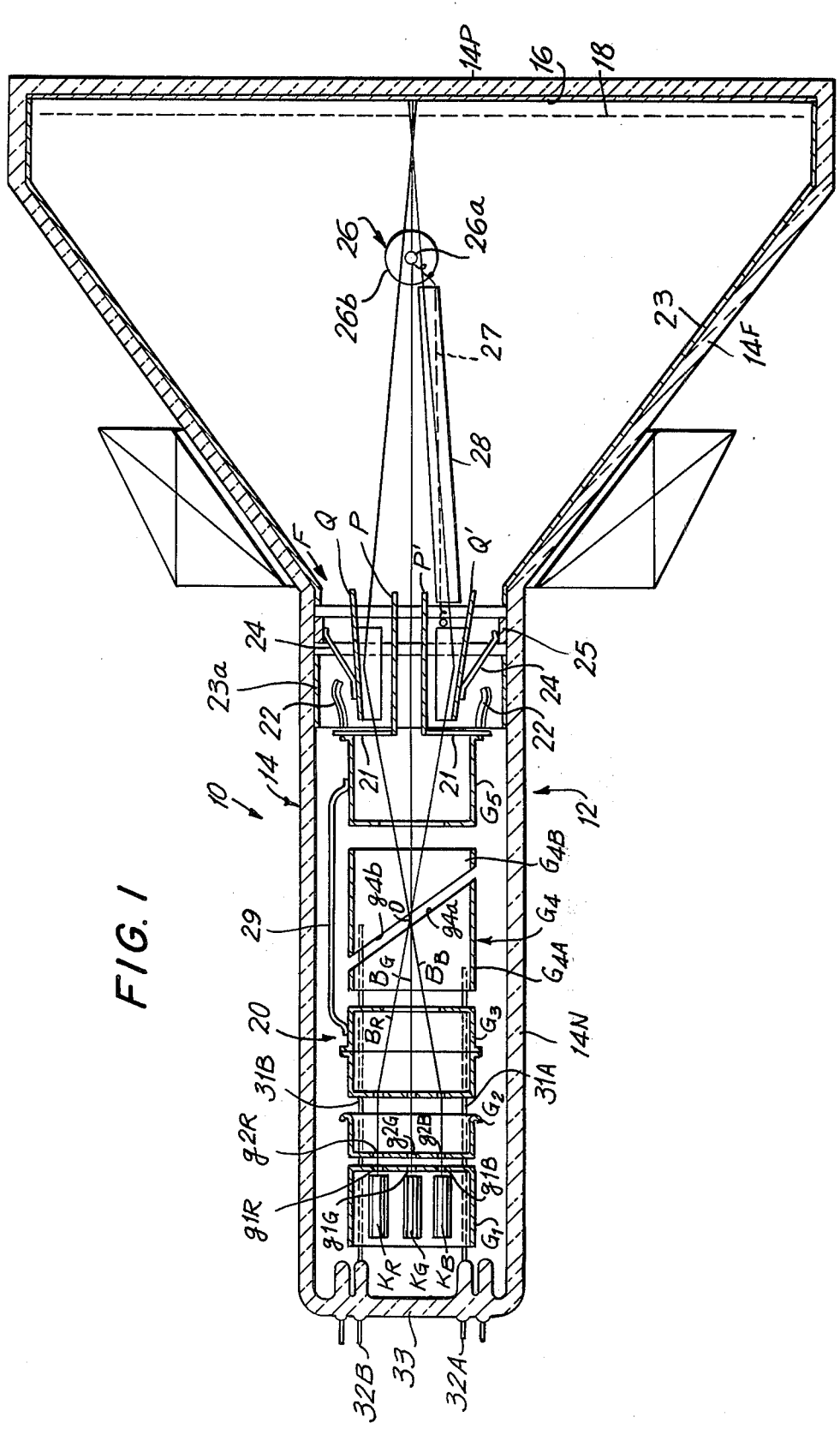
FIG. 1 is a cross-sectional view through the axis of the cathode ray tube of a color video signal reproducing device embodying this invention, and which is taken in a horizontal plane, that is, in a plane parallel to the line-scanning direction.

Referring to the drawings in detail, and initially to FIG. 1 thereof, it will be seen that the invention is there shown applied to a color video signal reproducing device 10 of the Trinitron (trademark) type, for example, as disclosed in U.S. Pat. No. Re. 27,751. The device 10 is shown to generally comprise a single-gun, plural beam color cathode ray tube 12 having an envelope 14 that consists of a panel or face portion 14P, a funnel portion 14F and a neck portion 14N. The panel portion 14P has a color phosphor screen 16 coated on its inner surface and being composed of arrays of different color phosphor areas, that is, areas of phosphors which emit different colors when energized by respective electron beams, and which are arranged in groups each intended to form a picture or image element. Disposed adjacent screen 16 is an apertured beam-selecting grill or shadow mask 18. An electron gun 20 is disposed within neck 14N and is shown to include cathodes $K_R$, $K_G$ and $K_B$ which constitute respective beam-generating sources with the beam-generating surfaces thereof being disposed, as shown, in a plane which is substantially perpendicular to the coincident axes of electron gun 20 and tube 12. In the embodiment shown, the beam-generating surfaces are arranged in a straight line so that the respective beams $B_R$, $B_G$ and $B_B$ emitted therefrom are directed in a substantially horizontal plane containing the axis of the gun, with the central beam $B_G$ being coincident with such axis. A first grid $G_1$ is spaced from the beam-generating surfaces of cathodes $K_R$, $K_G$ and $K_B$ and has apertures $g_{1R}$, $g_{1G}$ and $g_{1B}$ formed therein in alignment with the respective cathode beam-generating surfaces. A second grid $G_2$ is spaced from first grid $G_1$ and has apertures $g_{2R}$, $g_{2G}$ and $g_{2B}$ formed therein in alignment with the respective apertures $g_{1R}$, $g_{1G}$ and $g_{1B}$ of first grid $G_1$. Successively arranged in the axial direction away from the common grid $G_2$ are tubular grids or electrodes $G_3$, $G_4$ and $G_5$, respectively, which, as hereinafter described, are operative to provide a so-called unipotential main focusing lens by which all of beams $B_R$, $B_G$ and $B_B$ are focused at screen 16. The cathodes $K_R$, $K_G$ and $K_B$, grids $G_1$ and $G_2$, and electrodes $G_3$, $G_4$ and $G_5$ are maintained in the depicted, assembled relative positions thereof, by conventional support means (not shown) of an insulating material.

For operation of the electron gun 20 of FIG. 1, appropriate voltages are applied to grids $G_1$ and $G_2$ and to electrodes $G_3$, $G_4$ and $G_5$. Thus, for example, a voltage of 0 to minus 400V is applied to grid $G_1$, a voltage of 0 to 500V is applied to grid $G_2$, a relatively high voltage or potential, for example, the anode voltage of 13 to 20KV is applied to electrodes $G_3$ and $G_5$, and a relatively low voltage or potential of 0 to only several KV is applied to electrode $G_4$, with all of these voltages being based upon the cathode voltage as a reference. With the foregoing voltage distribution, an electron lens field will be established between grid $G_2$ and electrode $G_3$ to form an auxiliary lens, and an electron lens field will be established around the axis of electrode $G_4$, by the electrodes $G_3$, $G_4$ and $G_5$, to form a main focusing lens. In a typical use of electron gun 20, bias voltages of 100V, 0V, 300V, 20KV, 200V and 20KV may be suitably applied to the cathodes $K_R$, $K_G$ and $K_B$, the first and second grids $G_1$ and $G_2$ and the electrodes $G_3$, $G_4$ and $G_5$, respectively.

In operation of electron gun 20, the electron beams $B_R$, $B_G$ and $B_B$, which emanate from the beam generating surfaces of cathodes $K_R$, $K_G$ and $K_B$ will pass through the respective grid apertures $g_{1R}$, $g_{1G}$ and $g_{1B}$, to be intensity modulated with what may be termed the "red", "green" and "blue" intensity modulation or color signals applied between said cathodes and the first grid $G_1$. The electron beams will then pass through the auxiliary lens and be made to converge by the latter so as to intersect each other substantially at the center 0 of the main focusing lens. Thereafter, the central beam $B_G$ will exit from the main focusing lens substantially along the tube axis, while the other or side beams $B_R$ and $B_B$ will exit along divergent paths.

Further included in the electron gun 20 of FIG. 1 is electron beam convergence deflecting means F which is positioned axially beyond electrode $G_5$ and comprises shielding plates P and P' disposed in the depicted spaced relationship at opposite sides of the gun axis, and axially extending, deflector plates Q and Q' which are disposed in outwardly spaced, opposed relationship to shielding plates P and P', respectively.

The shielding plates P and P' are equally charged so that the central electron beam $B_G$ will pass substantially undeflected between shielding plates P and P', while the deflector plates Q and Q' have negative or lower charges with respect to the plates P and P' so that electron beams $B_B$ and $B_R$, in moving along their above mentioned divergent paths, will be convergently deflected, as shown, by the respective passages thereof between the plates P and Q and the plates P' and Q', respectively. More specifically, a voltage which is equal to the voltage applied to the lens electrodes $G_2$ and $G_5$ may be applied to both shielding plates P and P', and a voltage which is some 200 to 300 V lower than the last mentioned voltage is applied to both deflector plates Q and Q' to result in the application of a deflecting voltage difference or convergence deflecting voltage between plates P' and Q' and plates P and Q and it is, of course, this convergence deflecting voltage which will impart the requisite convergent deflection to the respective electron beams $B_B$ and $B_R$.

In the illustrated cathode ray tube 12, shielding plates P and P' are secured to the adjacent end of the lens electrode $G_5$, as by conductive support members 21 from which conductive resilient contacts 22 extend into engagement with an extension 23a of a conductive film 23 coated on the inner surface of funnel portion 14F. Resilient conductive strips 24 extend from deflector plates Q and Q' to a C-shaped conductive leaf spring 25 which engages against a part of the neck portion 14N that is devoid of the conductive film extension 23a. A coaxial anode button 26 is sealed in the wall of funnel portion 14F and includes an inner terminal 26a connected by a conductor 27 extending through an insulator tube 28 to the C-shaped conductive spring 25 for applying the requisite voltage to plates Q and Q'. Anode button 26 further includes an outer terminal 26b through which an anode voltage is applied to conductive film 23. Such anode voltage is applied from film 23 to phosphor screen 16 and, by way of film extension 23a and contacts 22, to plates P and P' and lens electrode $G_5$. Further, a conductor 29 extends between lens electrodes $G_3$ and $G_5$ for applying the anode voltage to electrode $G_3$.

It will be apparent that the electron gun 20 is so arranged that, as a result of the convergence deflections imparted to beams $B_R$ and $B_B$ by convergence deflecting means F, electron beams $B_B$, $B_G$ and $B_R$ will again converge or cross each other at a common spot centered in an aperture or slit of beam selecting grill or mask 18 so as to diverge therefrom and impinge upon or strike the respective color phosphor areas of a corresponding group thereof on screen 16. The beams $B_R$, $B_G$ and $B_B$ are made to simultaneously scan screen 16 in the line-scanning or horizontal direction and in the vertical direction by means of a horizontal and vertical deflection yoke assembly 30 which is positioned about funnel portion 14F adjacent neck portion 14N, and which conventionally receives horizontal and vertical sweep signals.

It will be apparent that, in the above described color cathode ray tube 12, each of the beams $B_R$, $B_G$ and $B_B$ is passed, for focusing, through substantially the center 0 of the main focusing lens of gun 20 so that the beam spots formed by impingement of the beams on screen 16 will be substantially free of coma and/or astigmatism resulting from the focusing action of the main lens to provide improved color picture resolution.

Figure 2:
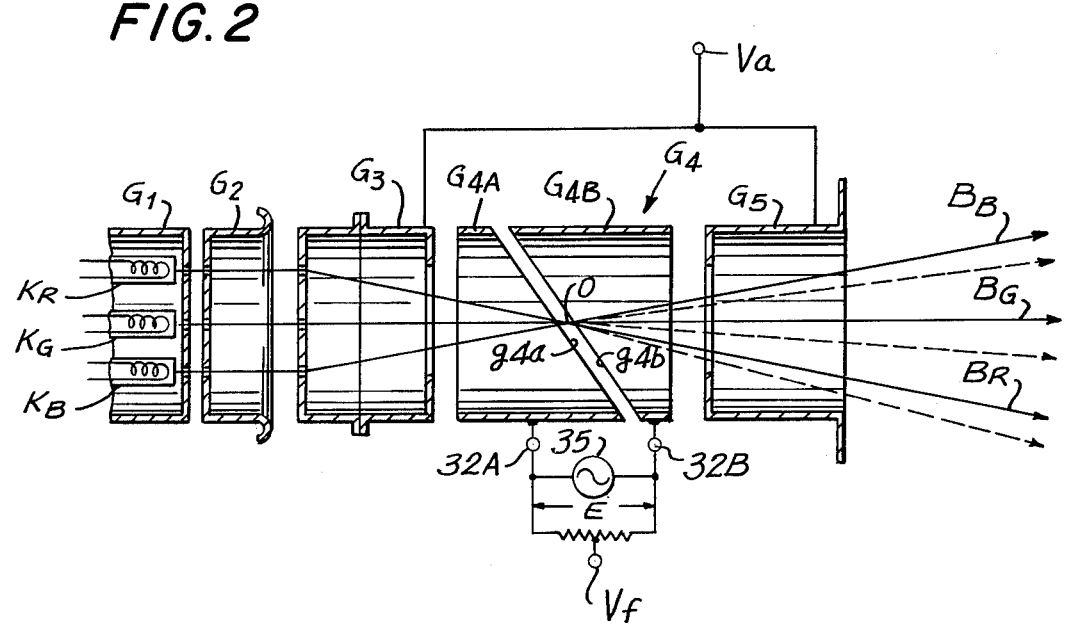
FIG. 2 is a schematic sectional view to which reference will be made in explaining the operation of the device of FIG. 1.
Figure 3:
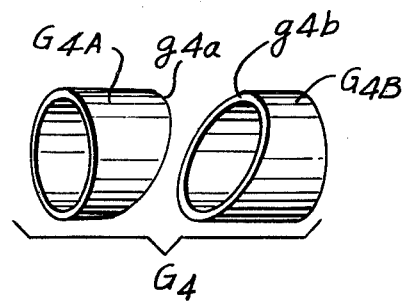
FIG. 3 is a detail perspective view showing one of the electrodes of the unipotential main focusing lens included in the embodiment of the invention illustrated on FIG. 1.

In accordance with the present invention, beam scanning velocity modulation is provided in the above descrined color video signal reproducing device 10 in order to enhance the sharpness of the demarcations between relatively dark and light areas of the color picture produced on screen 16. More specifically, in accordance with this invention, the tubular electrode $G_4$ of the main focusing lens which receives the relatively low biasing voltage or potential for producing the electrical focusing field is split diagonally, that is, is formed in two parts $G_{4A}$ and $G_{4B}$ which are axially separated and which have their adjacent end edges $g_{4a}$ and $g_{4b}$, respectively, lying in parallel vertical planes that are inclined relative to the coincident axes of gun 20 and tube 12 (FIGS. 1–3). Further, such parts $G_{4A}$ and $G_{4B}$ of lens electrode $G_4$ are preferably disposed so that the planes of their end edges $g_{4a}$ and $g_{4b}$ pass substantially close to the center 0 of the main focusing lens (FIGS. 1 and 2).

Lead wires or conductors 31A and 31B extend axially within neck portion 14N from electrode parts $G_{4A}$ and $G_{4B}$, respectively, to terminal pairs 32A and 32B which extend through a stem 33 at the end of neck portion 14N, and through which both parts $G_{4A}$ and $G_{4B}$ of electrode $G_4$ may have applied thereto the requisite voltage of 0 to only several KV, for example, a voltage of 400V., for operation of the main focusing lens, while the control signal for effecting velocity modulation, and which may have a peak-to-peak voltage of about 350V is applied between terminal pins 32A and 32B, and hence across electrode parts $G_{4A}$ and $G_{4B}$. More particularly, as shown schematically on FIG. 2, the focusing voltage $V_f$ for lens electrode $G_4$ may be applied to the midpoint of a resistor 34 which is connected across terminal pins 32A and 32B while the velocity modulating signal E is applied between terminal pins 32A and 32B from a circuit 35.

It will be apparent that, by reason of the described diagonal separation between parts $G_{4A}$ and $G_{4B}$ of focusing lens electrode $G_4$, the application of the velocity modulation control signal E across such electrode parts results in a respective electric field which deflects beams $B_R$, $B_G$ and $B_B$ in the horizontal or line-scanning direction, for example, from the positions shown in broken lines on FIG. 2. Since the deflection field for velocity modulation is formed at or near the center 0 of the main focusing lens, that is, the location at which the three beams $B_R$, $B_G$ and $B_B$ intersect each other, all three of the electron beams pass through the same region of the deflection field and thus are equally influenced by the latter. Further, in applying the present invention to a color cathode ray tube 12 of the Trinitron (trademark) type, that is, one in which the three beams intersect at the center of the main focusing lens, the horizontal deflection of the beams for velocity modulation purposes is achieved without deflecting any of the beams into peripheral portions of the main focusing field where coma and/or astigmatism might be imparted to the focused beams.

It is also to be seen that since the control signal E for velocity modulation is applied across parts $G_{4A}$ and $G_{4B}$ of the focusing lens electrode $G_4$ which otherwise receives a relatively low focusing voltage $V_f$, the levels of the control signal for velocity modulation may be relatively low so as to facilitate the production of such control signal and its safe handling, while making possible the attainment of high deflection sensitivity. Such deflection sensitivity may be expressed as:

$$(\Delta\theta/\Delta V) = 8.12 \times 10^{-6} \text{ rad/V}$$

in which $\Delta\theta$ is the angle through which beam is deflected, and $\Delta V$ is the potential difference between electrode parts $G_{4A}$ and $G_{4B}$. Further, it is to be noted that the application of beam scanning velocity modulation to the color cathode ray tube 12 in accordance with this invention requires the provision of only one additional terminal pin on such tube. More specifically, in the absence of the provision of velocity modulation, a single terminal pin would have to be provided through stem 33 for applying the focusing voltage to electrode $G_4$; whereas, in accordance with this invention, only two terminal pins 32A and 32B are required for applying to electrode parts $G_{4A}$ and $G_{4B}$ both such focusing voltage $V_f$ and the control signal E. Finally, it will be appreciated that the application of velocity modulation according to this invention to the electron gun 20 does not increase the length of the latter so that such gun can be accommodated in a relatively short neck portion 14N of the tube envelope, as is desired for reducing the required depth of the cabinet.

Figure 4:
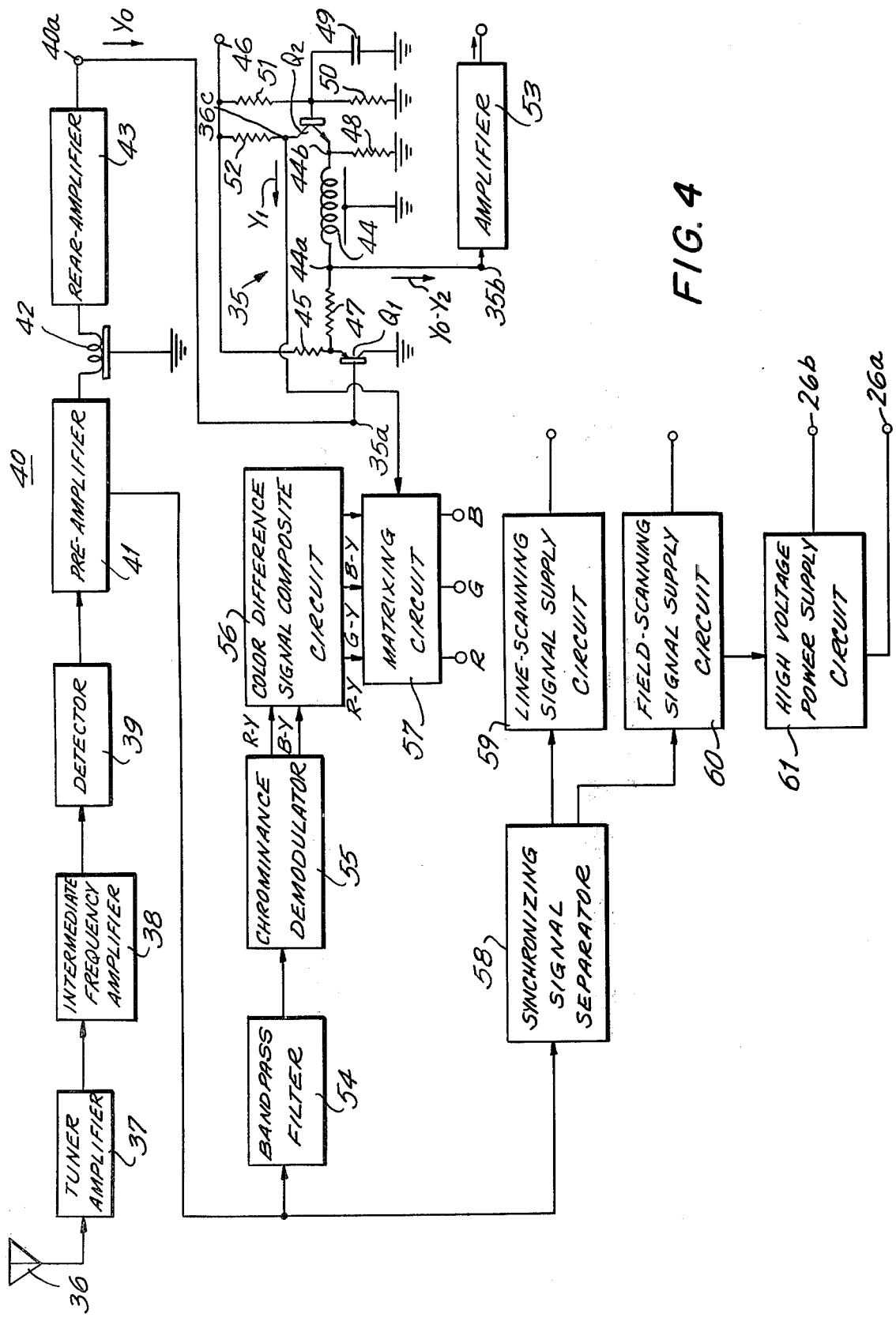
FIG. 4 is a block diagram of a circuit according to this invention for providing the control signal by which beam scanning velocity modulation is achieved.

Referring now to FIG. 4, it will be seen that, in a circuit arrangement for producing the control signal E in response to transient changes in the brightness component of a video signal, the video signal, for example, a color television signal, may be received by an antenna 36 and passed through a tuner amplifier 37 and intermediate frequency amplifier 38 to a detector 39. The detected output then goes to a video amplifier circuit 40 consisting of a pre-amplifier 41, a delay line 42 and a rear-amplifier 43 to derive a brightness or luminance signal $Y_o$ from an output terminal 40a of video amplifier circuit 40.

The brightness signal $Y_o$ is supplied to an input terminal 35a of the circuit 35 for producing the control signal in response to transient changes in the brightness or luminance of the color video signal. In accordance with this invention, the circuit 35 is shown to preferably contain only a single delay line 44 having input and output ends 44a and 44b with the luminance or brightness signal $Y_o$ being applied to input end 44a by way of a transistor $Q_1$ of collector-common configuration which acts to amplify the signal without altering the phase thereof. More specifically, as shown, transistor $Q_1$ has its base electrode connected to input terminal 35a for receiving the luminance signal $Y_o$, while the collector electrode of transistor $Q_1$ is connected to ground and its emitter electrode is connected, through a resistor 45, to an operating voltage source 46 and, through a resistor 47, to the input end 44a of delay line 44. Further, as shown, the output end 44b of delay line 44 is connected through a bleeder resistor 48 to ground, and also connected to a transistor $Q_2$ of base-common configuration which acts as an impedance converter. More specifically, the transistor $Q_2$ is shown to have its emitter electrode connected to output end 44a of delay line 44, while its base electrode is connected to ground through a capacitor 49 and also connected between biasing resistors 50 and 51 which are connected in series between voltage source terminal 46 and ground. Finally, a resistor 52 is shown to be connected between voltage source terminal 46 and the collector electrode of transistor $Q_2$, and an output terminal 35b of circuit 35 is connected to input end 44a of delay line 44 and a second output terminal 35c is connected to the collector electrode of transistor $Q_2$.

In the circuit 35 as described above, bleeder resistor 48 is dimensioned to provide small current flow therethrough, for example, of the order of approximately 3 to 4 m.A, while the input impedance, that is, the base-emitter impedance, of transistor $Q_2$ is very small in respect to the impedance of resistor 48. Therefore, in response to a transient or sharp change in the luminance signal transmitted along delay line 44, the output end 44b of the latter is shorted to ground so as to cause a negative reflected wave to travel back along delay line 44 to its input end 44a. As a result of the foregoing, and assuming that a signal traveling along delay line 44 is delayed by the time $\tau$, it will be apparent that the resistor 52 detects the short circuit current at the output end of delay line 44, and more precisely at the collector electrode of transistor $Q_2$, so as to provide a corresponding voltage or signal $Y_1$ at output terminal 35c which corresponds to the original luminance signal $Y_o$ once delayed by delay line 44, that is, delayed by the time $\tau$. Further, the reflected wave returning to the input end of delay line 44 in response to a transient change in the luminance signal $Y_o$ results in a signal $Y_2$ that corresponds to the signal $Y_o$ twice delayed by the delay line 44, that is, delayed by the time $2\tau$. Therefore, in response to a transient change in the luminance signal $Y_o$, there is obtained at output terminal 35b the difference between luminance signal $Y_o$ and the twice delayed signal $Y_2$, that is $Y_o-Y_2$. Such signal $Y_o-Y_2$ obtained at output terminal 35b may be amplified by an amplifier 53 to provide the control signal E which is merely $Y_o-Y_2$ after amplification, and which is applied across electrode parts $G_{4A}$ and $G_{4B}$ of electron gun 20 for effecting the desired velocity modulation.

Figure 5:
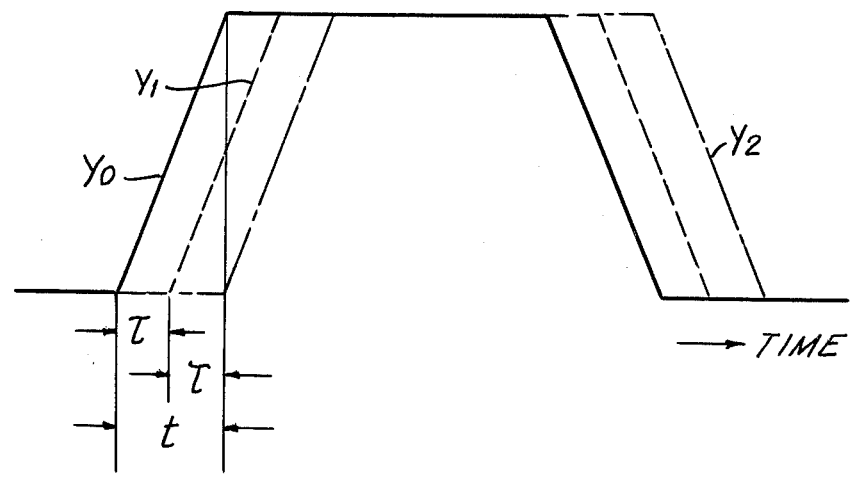
FIGS. 5 and 6 are graphs to which reference will be made in explaining the operation of the circuit shown on FIG. 4.
Figure 6:
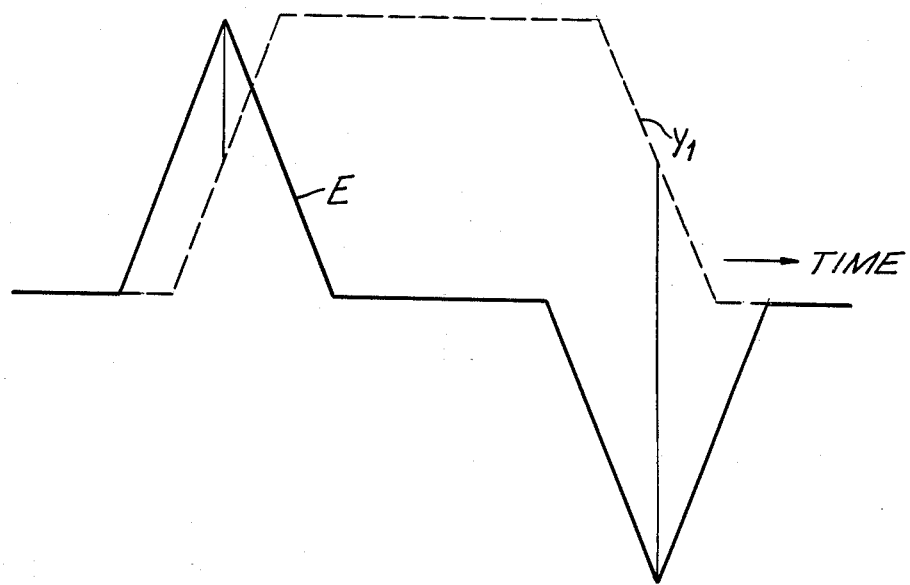

Maintenance of the sharpness of images produced by a cathode ray tube is most difficult when the brightness or luminance signal $Y_o$ changes from the black level to the white level or from the white level to the black level, which is the largest possible level change and is shown in FIG. 5. If the rise time and the fall time of the brightness signal $Y_o$ are each represented by $t$, the time delay $\tau$ of the delay line 44 is chosen to be one half of $t$. Experimental tests have indicated that $t$ is on the order of 0.2 $\mu$ sec. Thus, the delay time $\tau$ may be chosen, for example, to be 0.1 $\mu$ sec. Of course, the delay time $\tau$ may be varied so as to adjust it to a suitable value. The control signal E for modulating the scanning velocity becomes a positive pulse at the time that the signal $Y_o$ rises and a negative pulse at the time that the signal $Y_o$ falls, as shown in FIG. 6. This control signal E may have its level adjusted by suitably varying the gain of amplifier 53.

The signal $Y_1$ delayed the time $\tau$ from the signal $Y_o$ is supplied as a brightness or luminance signal to the usual circuits for controlling beam intensity in the cathode ray tube. As is shown in FIG. 6, the peak of each pulse of control signal E is coincident in time with the intermediate point of thn leading edge or trailing edge of the once delayed brightness or luminance signal $Y_1$ supplied to the cathode ray tube.

In the case of a color video signal reproducing device, as shown on FIG. 4, the color video signal obtained from preamplifier 41 of circuit 40 is supplied to a band-pass amplifier 54 from which is derived a chrominance signal which is then supplied to a chrominance demodulator 55 to obtain demodulated color signals, for example, color difference signals R—Y and B—Y. These signals R—Y and B—Y are supplied to a color difference signal composite circuit 56 to obtain three color difference signals R—Y, C—Y and B—Y which are then supplied to a matrixing circuit 57 along with the once delayed luminance signal $Y_1$ so as to obtain individual red color signals R, green color signals G and blue color signals B from circuit 57.

The color video signal obtained from preamplifier 41 of the circuit is also supplied to a synchronizing signal separator 58 to obtain line- and field-synchronizing signals. The line-synchronizing signal is supplied to a line-scanning signal supply circuit 59 to obtain a line or horizontal sweep or scanning signal, and the field-synchronizing signal is supplied to a field-scanning signal supply circuit 60 to obtain a field or vertical sweep scanning signal which is also supplied to a high voltage power supply circuit 61 to obtain the anode voltage and the convergence voltage which are respectively applied to the terminals 26b and 26a of anode button 26. Finally, the color signals, R, G and B obtained from matrixing circuit 57 are supplied to cathodes $K_R$, $K_G$ and $K_B$, respectively, of cathode ray tube 12 described with reference to FIG. 1. In the circuit shown on FIG. 4, the delay line 42 in video amplifier circuit 40 is provided with a delay time which is selected to ensure that the once delayed luminance signal $Y_1$ supplied to matrixing circuit 57 is coincident in time with the color-difference signals R—Y, G—Y and B—Y received by the matrixing circuit and thereby permits the latter to produce the desired color signals R, G and B.

It will be apparent that, in the color video signal reproducing device 10 as described above, the density or intensity of each of the electron beams $B_R$, $B_G$ and $B_B$ is modulated, at least in part, by the once delayed luminance signal $Y_1$, each of the beams is deflected in the line-scanning or horizontal direction and in the vertical direction by the line- and vertical-sweep signals supplied to yoke assembly 30 from circuits 59 and 60, respectively, and each of the beams is further slightly deflected in the line-scanning direction by the control signal E applied across the parts $G_{4A}$ and $G_{4B}$ of the main lens electrode $G_4$. The micro-deflection effected by the control signal E causes a modulation of the line-scanning velocity of each electron beam on the screen 16 at times when the signal $Y_1$ either rises or falls. More specifically, the line-scanning velocity begins to increase immediately before a rise in the signal $Y_1$, and returns to its normal velocity after the signal $Y_1$ has completely risen. conversely, the scanning velocity begins to decrease immediately before the signal $Y_1$ falls and is restored to its normal velocity after the signal $Y_1$ has completely fallen.

If the electron beam scanning velocity was not modulated by the signal E, the amount of light emitted from that portion of the screen 16 which corresponds to a rise or fall in the signal $Y_1$ would be relatively slowly changes. On the contrary, when the electron beam scanning velocity is modulated by the control signal E according to the invention, there is a decrease in the amount of light emitted from that portion of the screen 16 at which the scanning velocity is increased, while there is an increase in the amount of light emitted from that portion of the screen 113 at which the scanning velocity is decreased. Thus, when the electron beam scanning velocity is modulated by control signal E, the amount of light emitted from those portions of screen 16 at which the signal $Y_1$ rises and falls is suddenly changed, thereby improving the sharpness of images produced by cathode ray tube 12.

In the embodiment of the invention described above with reference to FIGS. 1–3, the arrangement for achieving beam scanning velocity modulation has been applied to a color cathode ray tube 12 having its gun 20 provided with a main focusing lens of the unipotential type, that is, composed of two tubular electrodes $G_3$ and $G_5$, to which the anode or other high voltage or potential is applied, and a tubular electrode $G_4$ interposed axially between electrodes $G_3$ and $G_5$ and to which a relatively low focusing voltage or potential $V_f$ is applied. However, as shown on FIGS. 7–9, beam scanning velocity modulation according to this invention can be also advantageously applied to other color cathode ray tubes, for example, to a color cathode ray tube 112 having a main focusing lens of the so-called bipotential type. As is shown on FIGS. 7 and 8, in which various components of the color cathode ray tube 112 that are similar to the corresponding components of the previously described tube 12 are identified by the same reference numerals and/or letters, the only substantial difference between the tubes 12 and 112 is in respect to the electron gun 20' of the latter. In such electron gun 20', the three focusing lens electrodes $G_3$, $G_4$ and $G_5$ forming the unipotential focusing lens of the previously described gun 20 are replaced by two focusing lens electrodes $G'_3$ and $G'_4$ which are arranged axially in succession after the second grid $G_2$ and which have a relatively low voltage or potential, for example, the voltage $V_f$, and a relatively high voltage or potential, for example, the anode voltage, respectively applied to electrodes $G'_3$ and $G'_4$ so that the latter form a bipotential main focusing lens in the gun 20'.

Figure 7:
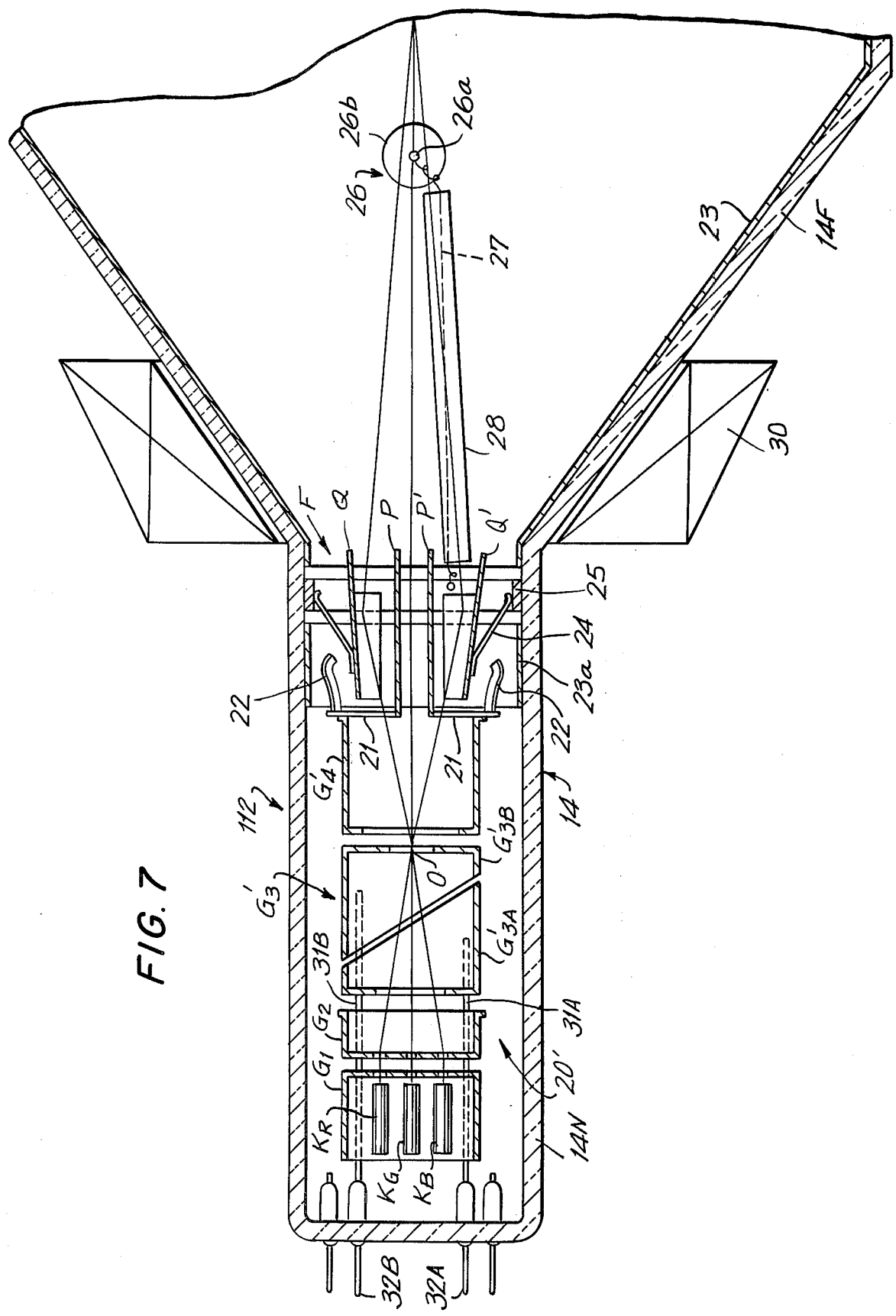
FIG. 7 is a cross-sectional view similar to that of FIG. 1, but showing a color video signal reproducing device according to another embodiment of this invention which employs a bipotential main focusing lens.
Figure 8:
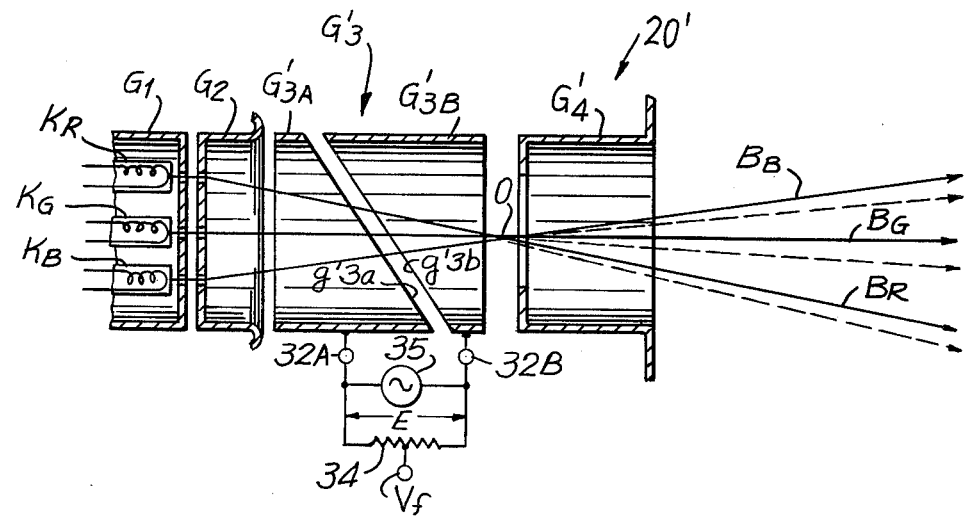
FIGS. 8 and 9 are views similar to those of FIGS. 2 and 3, respectively, but being applicable to the embodiment of the invention shown on FIG. 7.
Figure 9:
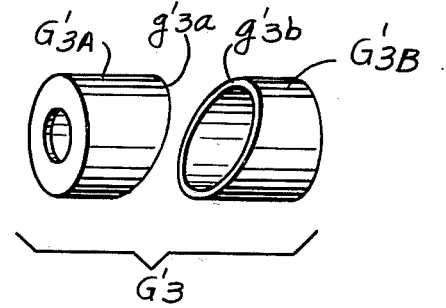

In accordance with the present invention, the tubular electrode $G'_3$ of the main focusing lens which receives the relatively low biasing or focusing voltage $V_F$ is split diagonally into two axially separated parts $G'_{3A}$ and $G'_{3B}$ which have their adjacent end edges $g'_{3b}$, respectively, lying in parallel vertical planes that are inclined relative to the coincident axes of gun 20' and tube 112 (FIGS. 7, 8 and 9). In this case, the lead wires or conductors 31A and 31B which extend from terminal pins 32A and 32B are respectively connected to electrode parts $G'_{3A}$ and $G'_{3B}$. Further, as shown on FIG. 8, the relatively low focusing voltage $V_f$ is again applied to the midpoint of resistor 34 having its opposite ends connected to terminal pins 32A and 32B, while the control signal E for effecting velocity modulation, as produced by circuit 35, is applied across terminal pins 32A and 32B. In the case of the electron gun 20' with a bipotential main focusing lens, the focusing electrode $G'_4$ receives the requisite high voltage or potential, for example, the anode voltage, by way of the terminal 26b of anode button 26, conductive film 23 and its extension 23a, contacts 22 and supports 21 by which the plates P and P' of convergence deflecting means F are mounted on electrode $G'_4$.

The bipotential main focusing lens constituted by electrodes $G'_3$ and $G'_4$ having relatively low and high potentials respectively applied thereto has its center O located at or near the adjacent ends of such electrodes, and the auxiliary lens constituted by an electric field produced by second grid $G_2$ and electrode $G'_3$ is effective to converge beams $B_R$ and $B_B$ so that all three beams $B_R$, $B_G$ and $B_B$ intersect each other substantially at the location 0. Further, by reason of the described diagonal splitting of focusing lens electrode $G'_3$ into into parts $G'_{3A}$ and $G'_{3B}$, the application of the velocity modulation control signal E across such electrode parts results in a respective electric field by which beams $B_R$, $B_G$ and $B_B$ are deflected in the horizontal or line-scanning direction, for example, from the positions shown in full lines to the positions shown in broken lines on FIG. 8. Although the deflection field for velocity modulation is not produced precisely at the location O where beams $B_R$, $B_G$ and $B_B$ are made to intersect in the gun 20', it will be apparent that the location at which the velocity modulation deflection of the beams occurs is relatively close to the location O of beam intersection so that all three beams are substantially uniformly affected by the electric field resulting from the control signal E, and further so that the velocity modulation of the beams does not greatly displace the intersection of the beams away from the center of the main focusing lens field. As in the first described embodiment, the embodiment of the invention illustrated on FIGS. 7–9 applies the velocity modulation control signal E across parts of a focusing lens electrode which is otherwise maintained at a relatively low potential so that the control signal E may be a relatively low level for safe handling while achieving good sensitivity. Since the bipotential main focusing lens of the gun 20' has only two tubular electrodes $G'_3$ and $G'_4$, it will be apparent that the application of the invention thereto permits the further reduction of the length of the electron gun 20', as compared with the first described gun 20.

Although a major advantage of this invention resides in the fact that it makes possible the desirable achievement of beam scanning velocity modulation in color video signal reproducing devices, for example, as described above with reference to FIGS. 1–9, the invention may also be advantageously applied to monochrome or black-and-white video signal reproducing devices. For example, as shown on FIG. 10, the electron gun 20'' of cathode ray tube for reproducing black-and-white video signals may have a single cathode K for emitting a single electron beam B which is directed toward a phosphor screen (not shown). A first or control grid $G''_1$ is associated with cathode K for controlling the intensity of beam B, for example, in response to the application between cathode K and first grid $G''_1$ of the once delayed luminance or brightness signal $Y_1$ derived by circuit 35. The gun 20'' is further shown to include a second grid $G''_2$ and tubular electrodes $G''_3$ and $G''_4$ arranged in axial succession, with the electrodes $G''_3$ and $G''_4$ forming a bipotential main focusing lens by which beam B is focused at the phosphor screen. In this case, the second grid $G''_2$ is employed merely for prefocusing.

Figure 10:
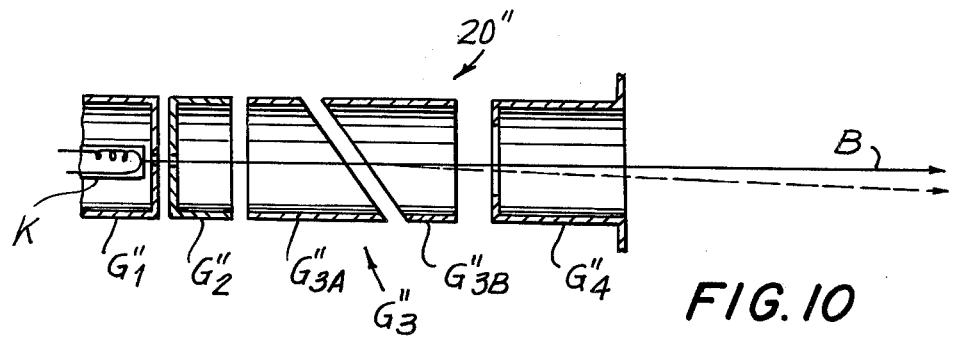
FIG. 10 is a schematic sectional view similar to FIGS. 2 and 8, but illustrating another embodiment of the invention applied to a monochrome or black-and-white video signal reproducing device.

In accordance with this invention, the main focusing lens electrode $g''_3$ to which a relatively low focusing voltage or potential is applied is diagonally split into two parts $G''_{3A}$ and $G''_{3B}$ which are similar to the parts $G'_{3A}$ and $G'_{3B}$ of FIGS. 7–9, and the velocity modulation control signal, for example, the signal E obtained from circuit 35, is applied across electrode parts $G''_{3A}$ and $G''_{3B}$ for deflecting beam B in the line-scanning direction, for example, from the position shown in full lines to the position shown in broken lines on FIG. 10.

It will be apparent that, in the case of a black-and-white video signal reproducing device according to this invention, for example, as shown schematically on FIG. 10, beam scanning velocity modulation is made possible without increasing the length of gun 20'' or providing the latter with additional electrodes or plates specifically for that purpose. Further, since the velocity modulation control signal is applied across parts $G''_{3A}$ and $G''_{3B}$ of a focusing electrode to which a relatively low potential is otherwise applied, good sensitivity to the contro signal may again be obtained notwithstanding the fact that such signal has a relatively low level for easy production and safe handling thereof.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a video signal reproducing device comprising a cathode ray tube having a phosphor screen; an electron gun in said tube including beam producing means directing at least one electron beam along the axis of said tube toward said screen for impingement on the latter, and main electron lens means disposed between said beam producing means and said screen for focusing each said beam at said screen, said main electron lens means having at least two tubular electrodes arranged coaxially in succession along said axis of the tube for the passage of each said beam through said electrodes with a relatively low potential being applied to one of said electrodes and a relatively high potential being applied to the other of said electrodes for producing an electrical field which effects said focusing of each said beam; and deflection yoke means on said tube between said main electron lens means and said screen for causing each said beam to scan said screen in line-scanning and vertical directions, respectively: the improvement of said one tubular electrode which is maintained at said relatively low potential being formed in two parts which are axially separated along a vertical plane that is inclined relative to said axis of the tube, and circuit means for applying across said two parts of said one tubular electrode a control signal which varies the scanning speed of each said beam in said line-scanning direction in response to transient changes in the brightness of the video signal being reproduced.

2. A video signal reproducing device according to claim 1; in which said main electron lens means is of the bipotential type and consists of said two electrodes with said one electrode being disposed in advance of said other electrode considered in the direction from said beam producing means toward said screen.

3. A video signal reproducing device according to claim 1; in which said main electron lens means is of the unipotential type and further includes a third tubular electrode aligned axially with said two electrodes, said relatively high potential is also applied to said third electrode, and said one electrode to which said relatively low potential is applied is axially interposed between said other and third electrodes to which said relatively high potential is applied.

4. A video signal reproducing device according to claim 1; in which said screen has arrays of phosphor areas emitting different colors and which are arranged in groups, said beam producing means directs additional electron beams toward said screen from points of origin that are spaced from the point of origin of said one beam for impingement of said one beam and said additional beams on respective phosphor areas of said screen, and said electron gun further includes means converging said beams from their respective points of origin for causing said beams to intersect each other at a location substantially centered within said main electron lens means.

5. A video signal reproducing device according to claim 4; in which said electron beams exit from said main electron lens means along divergent paths, and said electron gun further includes convergence deflecting means arranged along said divergent paths for reconverging said electron beams to impinge on respective phosphor areas of one of said groups thereof.

6. A video signal reproducing device according to claim 4; in which said points of origin of said additional beams are at opposite sides of, and in a common horizontal plane with said point of origin of said one beam.

7. A video signal reproducing device according to claim 4; in which said main electron lens means is of the bipotential type and consists of said two electrodes with said one electrode being disposed in advance of said other electrode considered in the direction from said beam producing means toward said screen; and in which said means converging the beams causes said location at which the beams intersect each other to be disposed near the adjacent ends of two electrodes.

8. A video signal reproducing device according to claim 4; in which said main electron lens means is of the unipotential type and further includes a third tubular electrode aligned axially with said two electrodes, said relatively high potential is also applied to said third electrode, said one electrode to which said relatively low potential is applied is axially interposed between said other and third electrodes to which said relatively high potential is applied, and said means converging the beams causes said location at which the beams intersect to be disposed substantially at the axial center of said one electrode.

9. A video signal reproducing device according to claim 4; in which said circuit means for applying said control signal across said two parts of said one electrode includes means for separating a luminance signal from a color video signal being reproduced, a single delay line having input and output ends, means for applying said luminance signal to said input end, means connected with said output end for obtaining the luminance signal once delayed by said delay line and for causing reflection of said once delayed luminance signal back along said delay line so as to provide said luminance signal twice delayed by said delay line at said input end, and means connected with said input end for deriving said control signal as the difference between said luminance signal and said twice delayed luminance signal; and further comprising means for obtaining color-difference signals from said color video signal, and matrixing means receiving said once delayed luminance signal and said color-difference signals and being operative to provide respective color signals for modulating the intensities of said electron beams, respectively.

10. A video signal reproducing device according to claim 9; in which said means connected with said output end of the delay line includes a transistor of base-common configuration through which said output end of the delay line is shorted in response to transient changes in said luminance signal, and means for detecting the short circuited current through said transistor so as to obtain said once delayed luminance signal therefrom.

11. A video signal reproducing device according to claim 10; in which said means for applying said luminance signal to said input end of the delay line includes a transistor of collector-common configuration.

12. A video signal reproducing device according to claim 1; in which said circuit means for applying said control signal across said two parts of said one electrode includes a single delay line having input and output ends, means for applying to said input end a brightness component of a video signal being reproduced, means connected with said output end for obtaining the brightness component once delayed by said delay line and for causing reflection of said once delayed brightness component back along said delay line so as to provide brightness component twice delayed by said delay line at said input end of the latter, and means connected with said input end for deriving said control signal as the difference between said brightness component and said twice delayed brightness component; and further comprising means for modulating the intensity of each said beam in response to at least said once delayed brightness component.

13. A video signal reproducing device according to claim 12; in which said means connected with said output end of the delay line includes a transistor of base-common configuration through which said output end of the delay line is shorted in response to transient changes in said brightness component, and means for detecting the short circuited current through said transistor so as to obtain said once delayed brightness component.

14. A video signal reproducing device according to claim 13; in which said means for applying said brightness component to the input end of said delay line includes a transistor of collector-common configuration.

15. In a video signal reproducing device comprising a cathode ray tube having a phorphor screen, an electron gun in said tube producing at least one electron beam which is focused at said screen, deflection yoke means on the tube for causing each said beam to scan said screen in line-scanning and vertical directions, respectively, means for modulating the intensity of each said beam in response to at least a first control signal which corresponds to the brightness of a video signal being reproduced, and means for modulating the line-scanning velocity of each said beam in accordance with a second control signal produced in response to transient changes in the brightness of the video signal being reproduced; a circuit for providing said first and second control signals comprising a single delay line having input and output ends, means for applying to said input end a brightness component of said video signal being reproduced, a transistor of base-common configuration connected to said output end of the delay line for shorting said output end in response to said transient changes so that said brightness component once delayed by said delay line is reflected from said output end back along said delay line for providing said brightness component twice delayed by said delay line at said input end of the latter, means for detecting the short circuited current through said transistor so as to obtain said once delayed brightness component therefrom as said first control signal, and means connected with said input end of the delay line for deriving therefrom said second control signal as the difference between said brightness component and said twice delayed brightness component.

16. A video signal reproducing device according to claim 15; in which said means for applying the brightness component to said input end of the delay line includes a transistor of collector-common configuration.

17. A video signal reproducing device according to claim 15; in which said phosphor screen has arrays of phosphor areas emitting different colors and which are arranged in groups, and said electron gun produces additional electron beams which are focused at said screen for impingement of said one beam and said additional beams are respective phosphor areas of said screen; and further comprising means for obtaining color-difference signals from a color video signal being reproduced, and matrixing means receiving said once delayed brightness component and said color difference signals and being operative to provide respective color signals for modulating the intensities of said electron beams, respectively.

* * * * *